United States Patent [19]

Katashiba et al.

[11] Patent Number: 5,359,975
[45] Date of Patent: Nov. 1, 1994

[54] CONTROL SYSTEM FOR INTERNAL COMBUSTION ENGINE

[75] Inventors: Hideaki Katashiba; Ryoji Nishiyama; Hitoshi Inoue, all of Amagasaki, Japan

[73] Assignee: Mitsubishi Denki Kabushiki Kaisha, Tokyo, Japan

[21] Appl. No.: 983,319

[22] Filed: Nov. 30, 1992

[30] Foreign Application Priority Data

Dec. 6, 1991 [JP] Japan ................... 3-323105

[51] Int. Cl.$^5$ ................. F02D 41/10; F02M 25/07
[52] U.S. Cl. ......................... 123/435; 123/571
[58] Field of Search ............... 123/425, 435, 571

[56] References Cited

U.S. PATENT DOCUMENTS

| | | | |
|---|---|---|---|
| 4,314,534 | 2/1982 | Nakajima et al. | 123/571 X |
| 4,531,499 | 7/1985 | Eckert et al. | 123/571 |
| 4,561,401 | 12/1985 | Hata et al. | 123/435 X |
| 4,622,939 | 11/1986 | Matekunas | 123/435 X |
| 4,624,229 | 11/1986 | Matekunas | 123/435 X |
| 4,721,089 | 1/1988 | Currie et al. | 123/571 |
| 4,727,849 | 3/1988 | Nishida et al. | 123/571 |
| 4,790,286 | 12/1988 | Nishida et al. | 123/571 |
| 4,913,118 | 4/1990 | Watanabe | 123/435 |
| 4,971,009 | 3/1991 | Washino et al. | 123/435 |
| 4,996,960 | 11/1990 | Nishiyama et al. | 123/435 |
| 5,205,260 | 4/1993 | Takahashi et al. | 123/571 X |
| 5,245,969 | 9/1993 | Nishiyama et al. | 123/435 X |

FOREIGN PATENT DOCUMENTS

103965 6/1984 Japan.

*Primary Examiner*—Willis R. Wolfe
*Attorney, Agent, or Firm*—Sughrue, Mion, Zinn, Macpeak and Seas

[57] ABSTRACT

An internal combustion engine control system comprises a pressure sensor for detecting pressure within an engine cylinder of an internal combustion engine, a crank angle sensor for detecting an engine cylinder identification number and a crank angle in synchronism with rotation of the engine, an intake air flow sensor disposed within an air intake pipe of the engine for detecting an intake air flow, and an exhaust gas recirculation flow control apparatus for controlling electrically a flow of exhaust gas of the engine recirculated to the engine by determining difference in the pressure within the engine cylinder between predetermined crank angles during a compression stroke of the engine on the basis of output signal of the pressure sensor, determining a first engine charging efficiency on the basis of the outputs of the crank angle sensor and the pressure difference, converting the intake air flow derived from the output of the intake air flow sensor to a second engine charging efficiency on the basis of the output of the crank angle sensor and by determining an exhaust gas recirculation ratio on the basis of the first and second engine charging efficiencies. The exhaust gas recirculation as well as control thereof is realized by an electronic programmable engine control unit.

3 Claims, 6 Drawing Sheets

CONTROL SYSTEM FOR INTERNAL COMBUSTION ENGINE

BACKGROUND OF THE INVENTION

1. Field of the Invention

The present invention relates generally to a control system for an internal combustion engine (hereinafter also referred to simply as the engine) and more particularly to an engine control system including an exhaust gas recirculation flow control apparatus which is capable of controlling electrically and/or electronically a recirculation flow of an exhaust gas of an engine.

2. Description of the Related Art

For having a better understanding of the present invention, description will first be made of a hitherto known engine control apparatus of which improvement is contemplated by the present invention.

Figure 5:
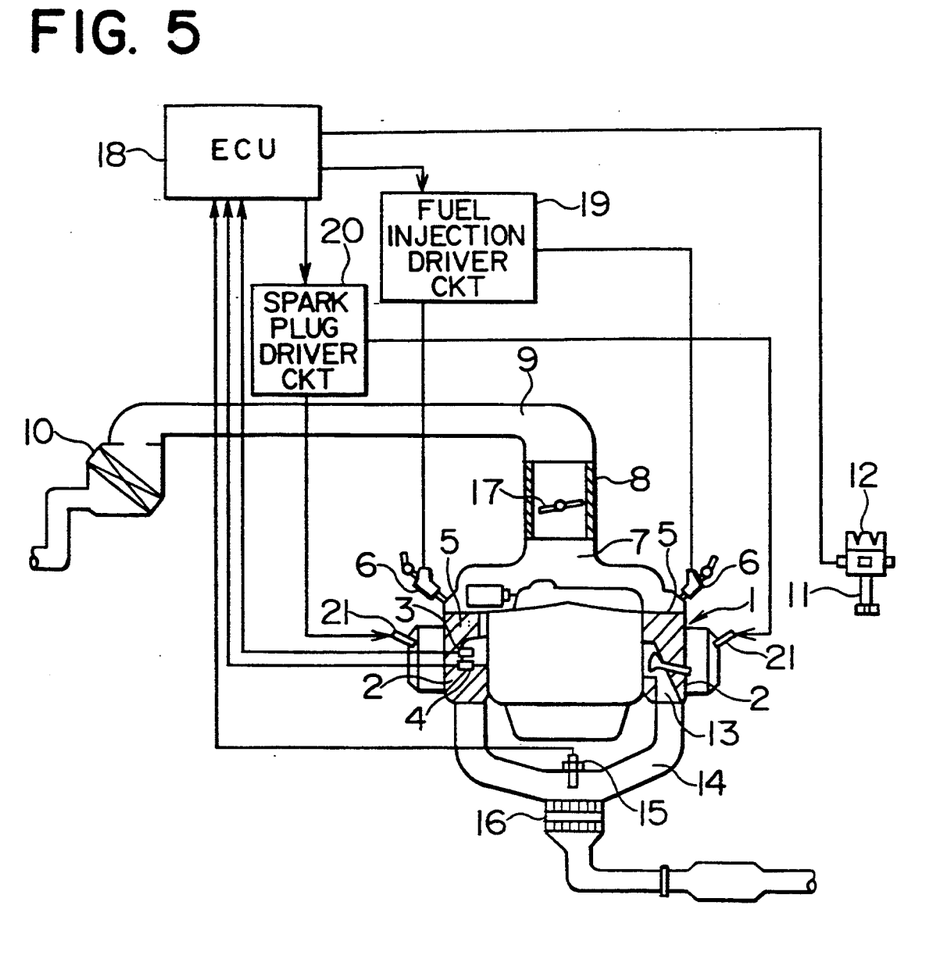
FIG. 5 is a schematic diagram showing a structure of an engine control system known heretofore.

FIG. 5 shows schematically an arrangement of a hitherto known engine control system in which a cylinder pressure sensor is employed for detecting a pressure within a combustion chamber (hereinafter referred to as the cylinder pressure) of an engine, as is disclosed, for example, in Japanese Unexamined Patent Application Publication No. 253543/1989 (JP-A-1-253543). Referring to the figure, an engine body 1 includes a plurality of cylinders each of which has a cylinder head 2 equipped with a cylinder pressure sensor 3 and a cylinder temperature sensor 4 in such disposition that the respective sensor elements are exposed to the interior of the associated cylinder. A fuel injector 6 is installed in an intake port 5 communicated to each cylinder of the engine 1, the intake port 5 being additionally connected to a throttle chamber 8 by way of an intake manifold 7. The upstream side of the throttle chamber 8 is communicated to an air cleaner 10 via an air suction pipe 9. The engine 1 further includes a distributer 11 operatively coupled to a cam shaft (not shown) of the engine, which distributer in turn is provided with a timing sensor 12 for detecting predetermined crank angles of the individual cylinders. On the other hand, an air-fuel ratio sensor 15 is disposed at a conflux point of an exhaust gas manifold 14 which is communicated with discharge ports 13 of the engine 1. A catalytic converter 16 is disposed at an exit port of the exhaust gas manifold 14. A throttle valve 17 is mounted within the throttle chamber 8. An engine control unit (also referred to as ECU in abbreviation) 18 which is in charge of an overall engine control is realized by a microcomputer which in turn is constituted by a CPU (Control Processing Unit), a RAM (Random Access Memory), a ROM (Read-Only Memory), an input/output interface and others. The engine control unit ECU 18 has input terminals to which outputs of the various sensors 3, 4, 12 and 15 are electrically connected and output terminals to which the fuel injector 6 and spark plugs 21 are electrically connected via associated driver circuits 19 and 20. The spark plugs 21 are fixedly mounted on the cylinder heads 2 of the individual cylinders, respectively.

An amount $G_a$ of air charged in each cylinder can be arithmetically determined by the ECU 18, for example, in accordance with the following expression (1):

$$G_a = (P \times V)/(R \times T) \quad (1)$$

where P represents a cylinder pressure measured or determined by the ECU 18 at a predetermined crank angle (e.g. BTDC 90° CA indicating a crank angle of 90° before the top dead center) during a compression stroke of each cylinder, the crank angle in turn being determined on the basis of the signal supplied from the timing sensor 12. Further, V represents a volume of the combustion chamber at the predetermined crank angle mentioned above, R represents a gas constant effective during the compression stroke, and T represents the intra-cylinder gas temperature which can be determined on the basis of the output signal of the cylinder temperature sensor 4.

Figure 6:
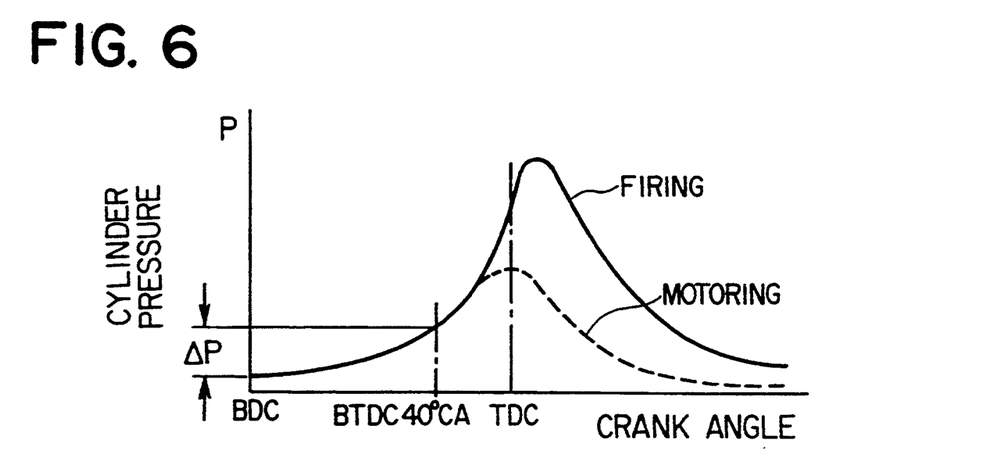
FIG. 6 is a characteristic diagram for illustrating an aspect of an engine control method known heretofore.
Figure 7:
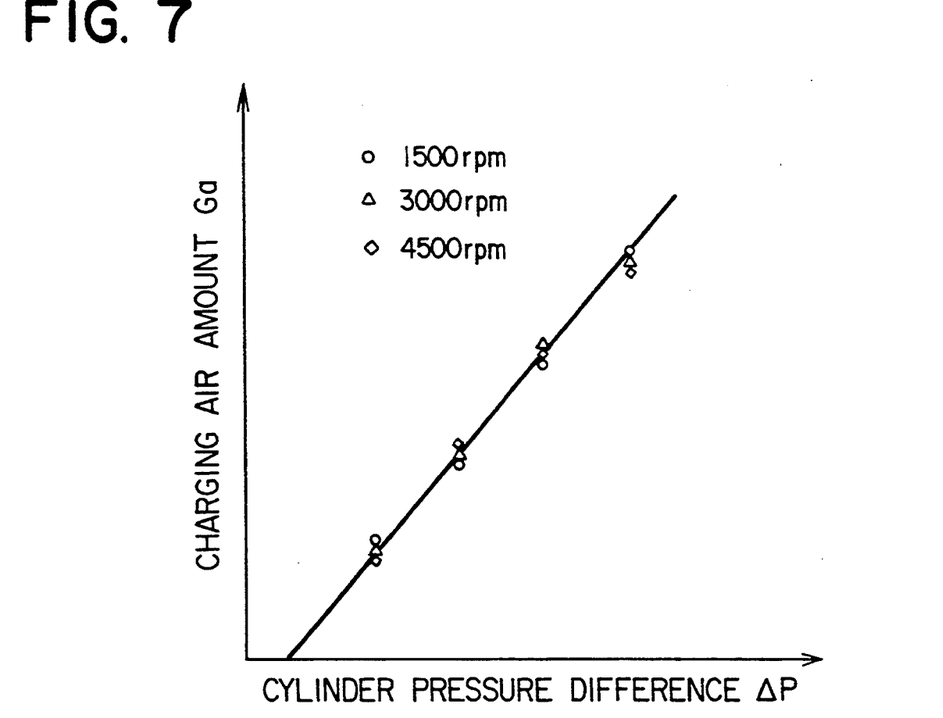
FIG. 7 is a characteristic diagram for illustrating an another aspect of an engine control method known heretofore.

On the other hand, it is taught in JP-A-59-221433 that the air charge amount $G_a$ bears a linear relation to a cylinder pressure difference ΔP, as shown in FIG. 7. In this conjunction, the cylinder pressure difference ΔP represents a difference in the cylinder pressure between the bottom dead center (BDC) and a position corresponding to a crank angle of 40° CA before the top dead center (i.e. BTDC 40° CA) in the compression stroke, as can be seen in FIG. 6. An intake air amount can arithmetically be determined on the basis of this difference in the cylinder pressure between the two predetermined crank angles in the compression stroke in accordance with the linear relationship mentioned above.

Figure 8:
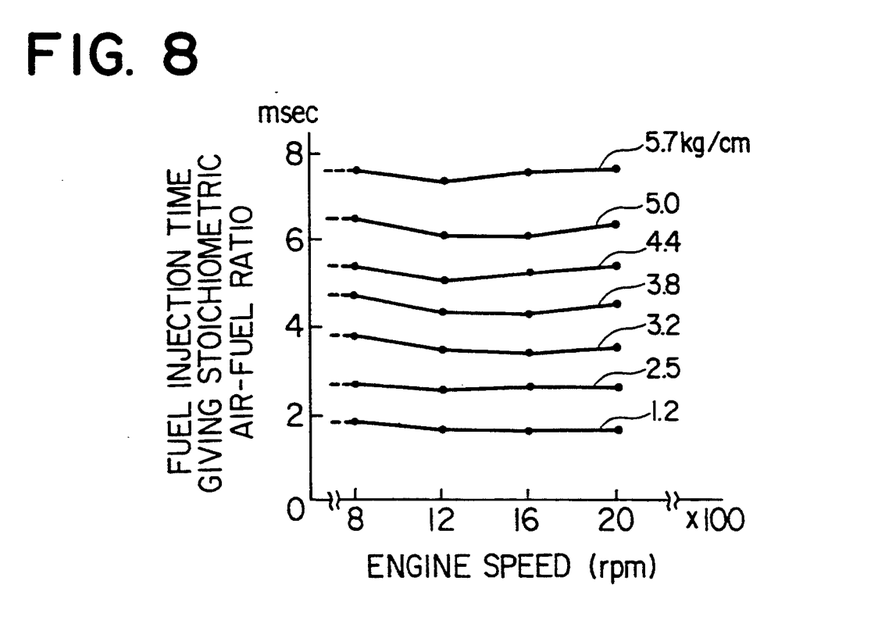
FIG. 8 is a characteristic diagram for illustrating a yet another aspect of an engine control method known heretofore.

Further, there is disclosed in JP-A-60-47869 a method of determining a fuel injection timing by consulting a two-dimensional fuel injection timing map table stored previously in a ROM of the engine control unit or ECU and containing data of the cylinder pressure difference ΔP with engine rotation speed N (rpm) being used as a parameter, as is illustrated in FIG. 8.

The ECU 18 executes the process for calculating or determining the charged air amount $G_a$ of the engine in the manner described above. On the basis of the charged air amount determined in this way, a fuel injection pulse width $T_i$ is computed in accordance with the following expression (2):

$$i\ T_i = K \times G_a \times K_{FB} \quad (2)$$

where K represents an air-fuel ratio constant and $F_{FB}$ represents an air-fuel feedback correction quantity. On the basis of the fuel injection pulse width as calculated, the ECU 18 supplies a signal to the driver circuit 19 for driving the fuel injector 6, to thereby effectuate the air-fuel ratio control.

Additionally, there is disclosed in JP-A-59-103965 a method of determining the ignition timing with the aid of a two-dimensional ignition timing map table containing ignition time points determined previously for every engine operation state on the basis of the cylinder pressure value and the engine rotation speed (rpm) by measuring the cylinder pressure in terms of the absolute value at a crank angle of 45° after the bottom dead center (i.e. at ABDC 45° CA). Determination of such ignition timing can of course be executed by the ECU 18, which then supplies a corresponding drive signal to the spark plug driver circuit 20 for causing the spark plug 21 to generate a spark.

The hitherto known engine control systems of the structures described above suffer from various problems mentioned below. First, it must be pointed out that in any one of the known control systems, no measures are adopted for coping with reduction of nitrogen oxides contained in the exhaust gas. Secondly, the conventional exhaust gas recirculation flow control apparatus (not shown in FIG. 5) is so implemented as to control mechanically the exhaust gas recirculation by measuring the actual exhaust gas recirculation ratio. Besides, it is impossible with the known systems to confirm definitely whether or not an exhaust gas recirculation ratio which is appropriate for the current engine operation or running state has been attained. Additionally, it is also impossible to detect occurrence of failure or abnormality in the recirculation ratio control due to degradation in operation of the exhaust gas recirculation flow control apparatus (e.g. decrease of the gas flow through the apparatus due to deposition of smudges in the piping).

SUMMARY OF THE INVENTION

In the light of the state of the art described above, it is an object of the present invention to provide an improved engine control system which can avoid problems or disadvantages of the engine control systems known heretofore.

Another object of the present invention is to provide an engine control system which can control the exhaust gas recirculation flow in dependence on the running state of the engine by determining an exhaust gas recirculation ratio.

It is a further object of the present invention to provide an engine control apparatus which can generate an alarm when the exhaust gas recirculation control becomes ineffective due to degradation of operation of the exhaust gas recirculation flow control apparatus or other causes.

In view of the above and other objects which will become apparent as description proceeds, there is provided according to an aspect of the present invention an engine control system which comprises a pressure sensor for detecting a pressure within an engine cylinder of an internal combustion engine, a crank angle sensor for detecting an engine cylinder identification number and a crank angle in synchronism with rotation of the engine, an intake air flow sensor disposed in an air intake pipe of the engine for detecting an intake air flow, an exhaust gas recirculation flow control apparatus for controlling electrically a flow of exhaust gas of the engine which is recirculated to the engine, a pressure difference determining means for determining difference in the pressure within the engine cylinder between predetermined crank angles during a compression stroke of the engine, charging efficiency determining means for arithmetically determining a first engine charging efficiency on the basis of the outputs of the crank angle sensor and the pressure difference determining means, charging efficiency converting means for converting the intake air flow derived from the output of the intake air flow sensor to a second engine charging efficiency on the basis of the output of the crank angle sensor, and an exhaust gas recirculation ratio determining means for arithmetically determining an exhaust gas recirculation ratio on the basis of the first and second engine charging efficiencies.

According to a preferred mode for carrying the invention, the internal combustion engine control system mentioned above may further comprise an engine running state determining means for determining the running state of the engine, and an exhaust gas recirculation ratio index value output means for generating an exhaust gas recirculation ratio index value on the basis of the running state of the engine, wherein the exhaust gas recirculation flow control apparatus is controlled on the basis of the exhaust gas recirculation ratio obtained from the exhaust gas recirculation ratio determining means and the exhaust gas recirculation ratio index value outputted from the exhaust gas recirculation ratio index value output means.

In a preferred embodiment of the present invention, the internal combustion engine control system may further include means for monitoring the operating state of the exhaust gas recirculation flow control apparatus by comparing the exhaust gas recirculation ratio index value with the actual exhaust gas recirculation ratio, wherein when occurrence of abnormality in operation of the exhaust gas recirculation flow control apparatus is decided by the monitor means, an alarm is generated.

As is apparent from the above, it is taught according to the present invention that a first engine charging efficiency is determined by the charging efficiency determining means on the basis of difference in the cylinder pressure between given two crank angles in the compression stroke. Thus, in determination of the first engine charging efficiency, there can be taken into account a flow or amount of the non-combustible exhaust gas which is recirculated to the engine. On the other hand, in the case of the second engine charging efficiency arithmetically determined on the basis of the intake air flow derived from the output of the intake air flow sensor, no consideration is paid to the recirculated exhaust gas. Accordingly, the difference between the first and second engine charging efficiencies represent a flow or amount of the recirculated exhaust gas. Further, the ratio of the recirculated exhaust gas flow to the intake air flow provides a basis for determining the exhaust gas recirculation ratio.

Thus, according to the present invention, it is possible to control the exhaust gas recirculation ratio such that the exhaust gas recirculation optimum for the current engine running state can be realized.

Additionally, an alarm can be generated in case the optimum exhaust gas recirculation ratio can no more be realized due to deposition of smudge on the exhaust gas flow path in the course of time lapse or failure of operation of a flow control valve incorporated in the exhaust gas recirculation control apparatus.

The above and other objects, features and attendant advantages of the present invention will be better understood from the following description of exemplary or preferred embodiments made by reference to the accompanying drawings.

DESCRIPTION OF THE PREFERRED EMBODIMENTS

Now, the present invention will be described in detail in conjunction with preferred or exemplary embodiments thereof by reference to the drawings.

Figure 1:
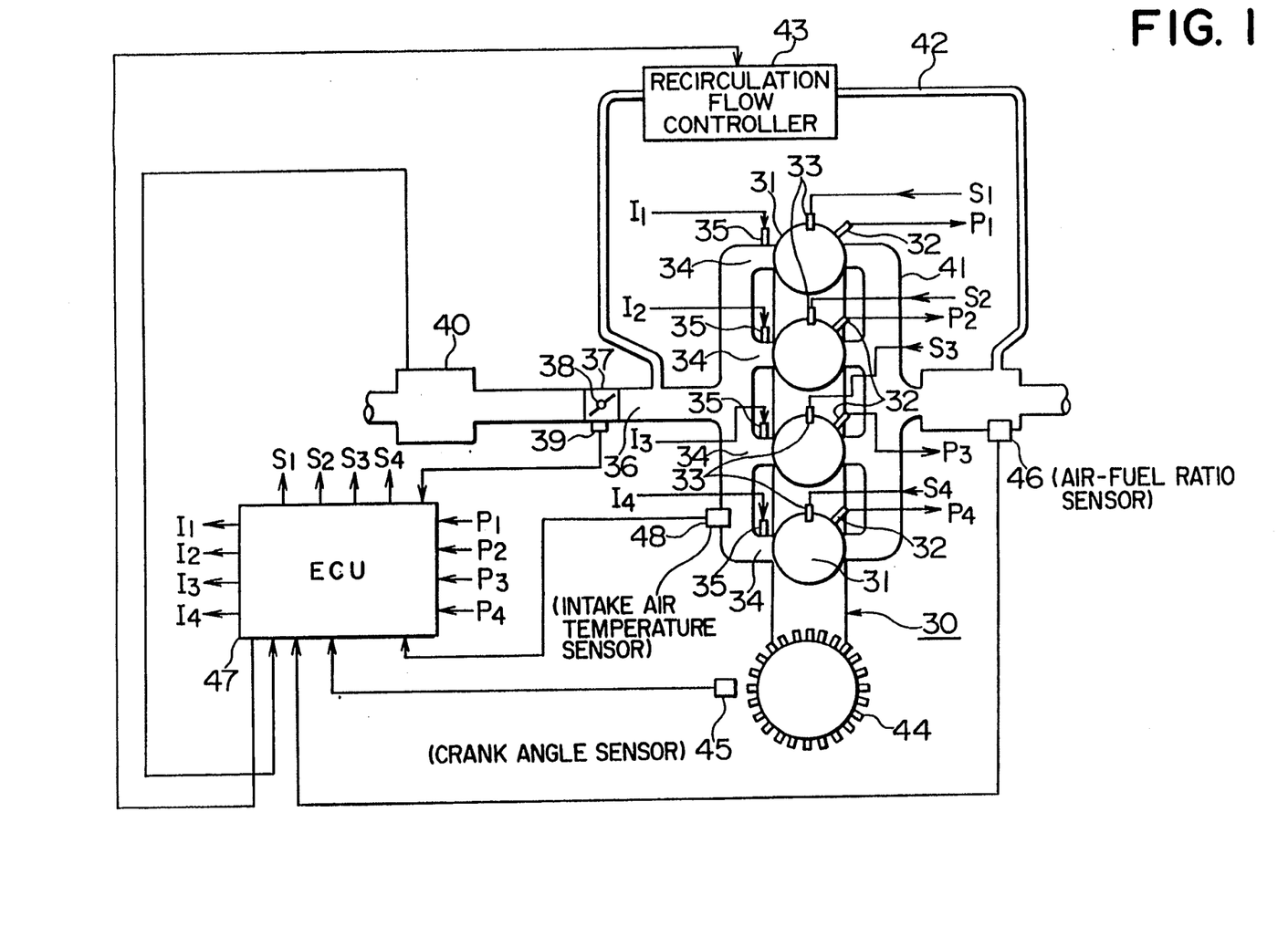
FIG. 1 is a block diagram showing generally an arrangement of an engine control system according to an embodiment of the present invention.

Referring to FIG. 1 which shows schematically a structure of an engine control system according to an embodiment of the invention, an internal combustion engine generally denoted by a numeral 30 includes a plurality of cylinders each having a cylinder head 31 in which a cylinder pressure sensor 32 and a spark plug 33 are installed, wherein an active sensor element of the cylinder pressure sensor 32 extends through the cylinder head 31 into a combustion chamber defined within the associated engine cylinder. A fuel injector 35 is disposed in each of air intake ports 34 communicated to the respective engine cylinders, which ports 34 are communicated to a throttle chamber 37 through an air intake manifold 36. Disposed within the throttle chamber 37 is a throttle valve 38, the opening degree of which is detected by a throttle sensor 39. An intake air flow sensor 40 is disposed upstream of the throttle chamber 37 for detecting the amount of intake air flow. It is further to be noted that an exhaust gas recirculating pipe 42 is provided for recirculating or feeding back some part of the exhaust gas tapped from an exhaust gas manifold 41 to the intake manifold 36. A recirculation flow control apparatus 43 is installed in the exhaust gas recirculating pipe 42 for electrically controlling the exhaust gas flow recirculated or feed back to the engine through the pipe 42. Provided in association with a ring gear (or toothed wheel) 44 connected operatively to a crank shaft (not shown) of the engine 30 is a crank angle sensor 45 for detecting a cylinder identification mark and predetermined crank angles set previously for each of the engine cylinders in synchronism with rotation of the engine. The crank angle sensor 45 is so designed as to produce a reference position pulse signal at every reference angular position of the crank shaft while generating a unit angle signal upon every increment of the crank angle by a unit angle (e.g. 1° CA). An air-fuel ratio sensor 46 is disposed at a conflux point of the exhaust gas manifold 41 of the engine 30. An engine control unit (hereinafter referred to as ECU in abbreviation) 47 includes a microcomputer incorporating a CPU, RAM, ROM, input/output interfaces and others, for controlling the driver circuits for the fuel injectors 35, spark plugs 33 and the exhaust gas recirculation control apparatus 43, respectively. The ECU 47 has input terminals to which there are connected the air-fuel ratio sensor 46, the cylinder pressure sensor 32, the crank angle sensor 45, the throttle opening degree sensor 39, the intake air flow sensor 40 and an intake air temperature sensor 48, respectively. Further, the ECU 47 has output terminals to which there are connected the fuel injectors 35, the spark plugs 33 and the exhaust gas recirculation control apparatus 43 via the respective driver circuits incorporated in the ECU 47.

Figure 2:
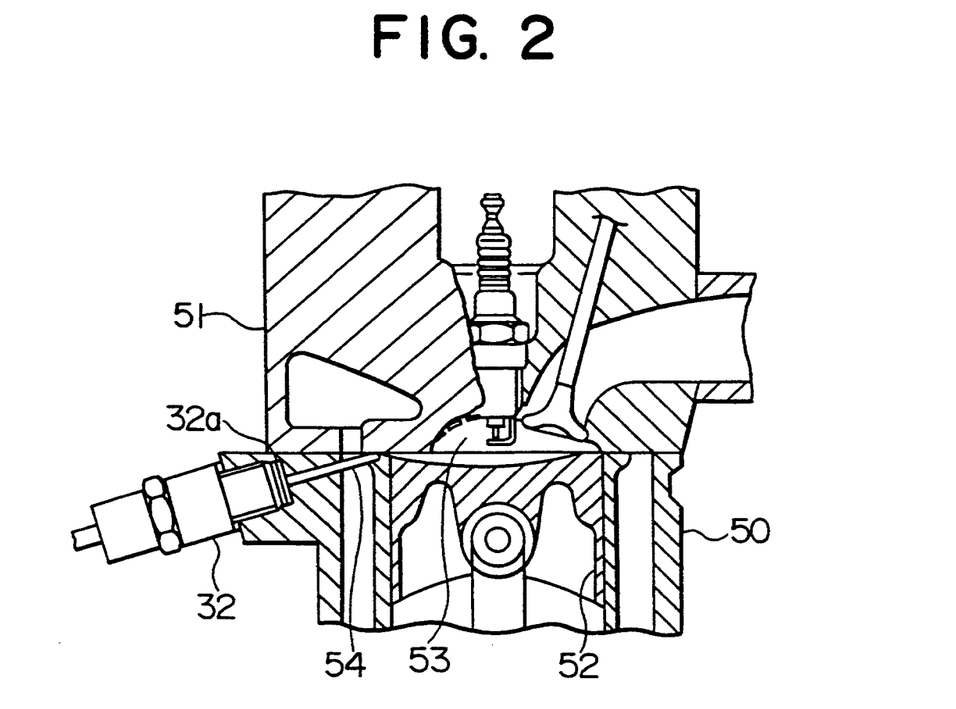
FIG. 2 is a partially enlarged view of an engine for illustrating a cylinder pressure sensor in the state installed in the engine in association with an engine cylinder.

FIG. 2 is an enlarged fragmental view of the engine showing the cylinder pressure sensor 32 in the state mounted in the cylinder head for detecting the pressure within the combustion chamber defined in the associated cylinder of the engine. Referring to the figure, a cylinder block 50 includes a cylinder head 51, a piston 52, a combustion chamber 53 and a pressure transmitting element 54. The cylinder pressure sensor 32 is mounted in the cylinder block 50 in such a manner as shown in FIG. 2 and has a pressure detecting part 32a operatively coupled to the pressure transmitting element 54 which is exposed to the interior of the engine combustion chamber 53 for detecting the pressure within the combustion chamber. The pressure detecting part 32a is connected to an electrical pressure transducer element (not shown) directly or indirectly through an interposed pressure transmitting medium such as, for example, silicone oil. The pressure transducer element may be constituted by a semiconductor pressure transducer element such as a piezoelectric element or the like.

Figure 3:
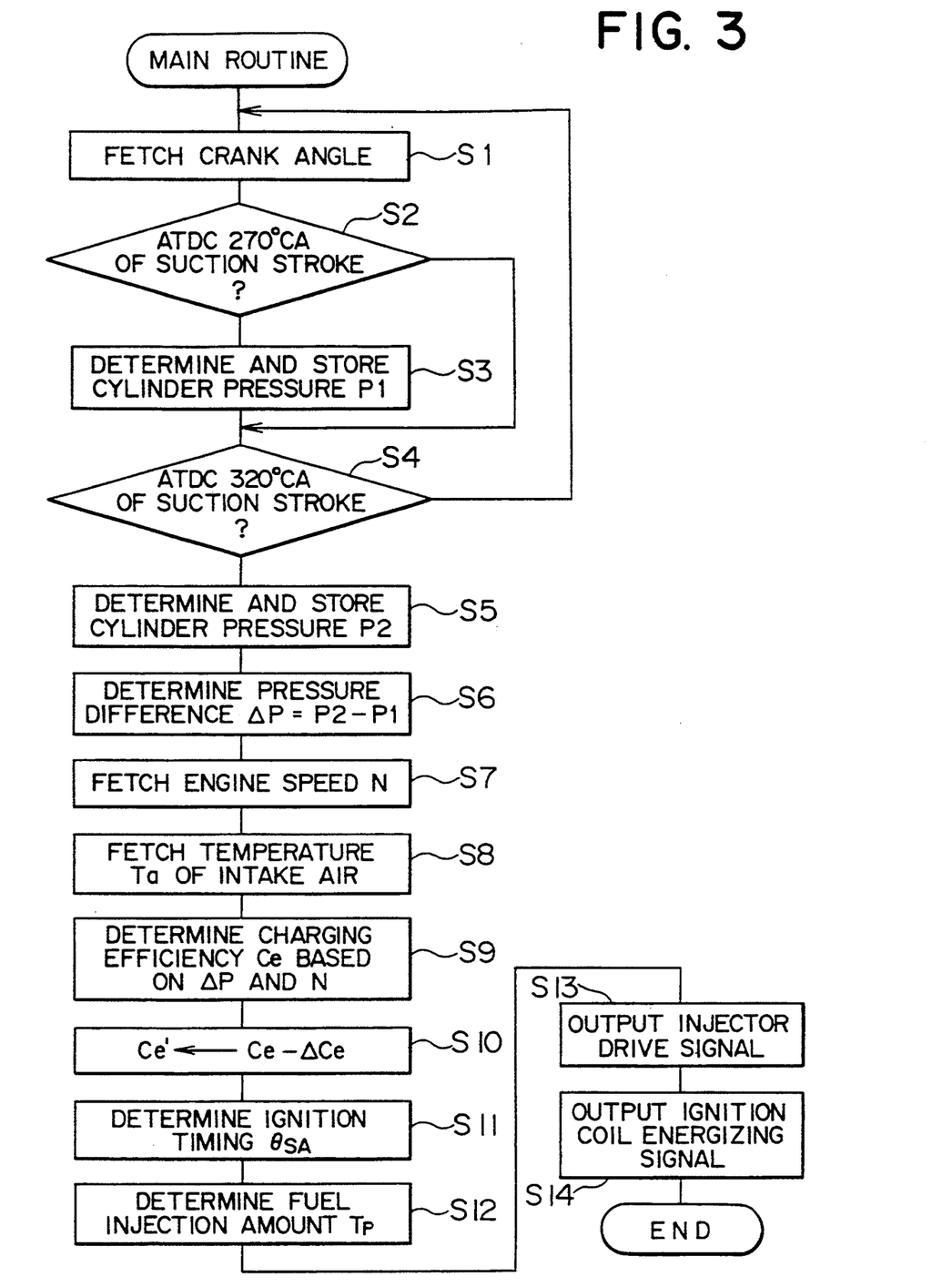
FIG. 3 is a flow chart for illustrating operation of the engine control system according to an embodiment of the invention.
Figure 4:
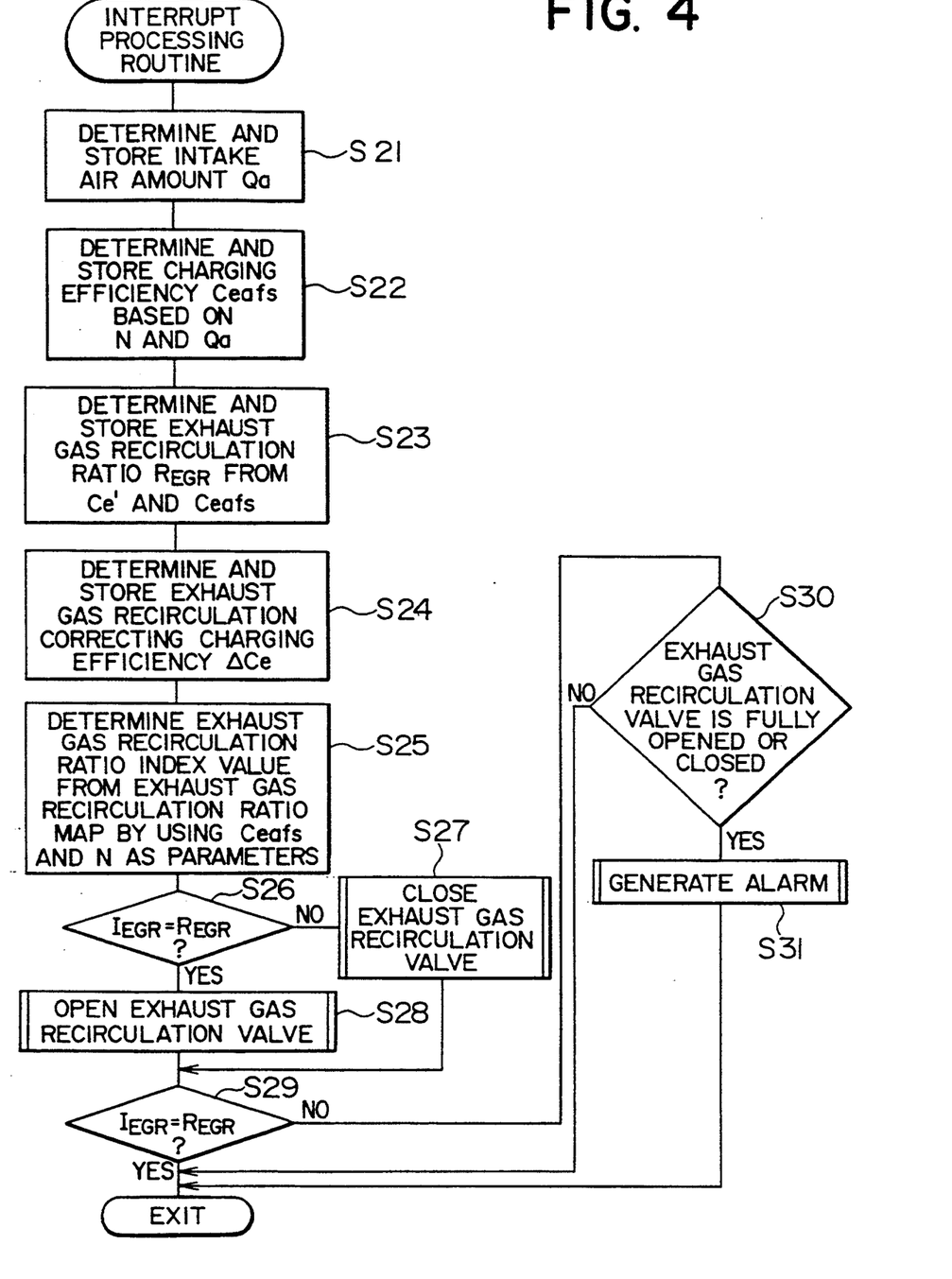
FIG. 4 is a flow chart for illustrating operation of the engine control system according to an another embodiment of the invention.

FIGS. 3 and 4 are flow charts for illustrating procedures for exhaust gas recirculation ratio calculation and control as well as alarm generation routines executed by the ECU. More specifically, FIG. 3 shows a main routine for controlling the fuel injection and the ignition timing and illustrates a procedure for performing an engine control on the basis of the output signal of the cylinder pressure sensor 32, while FIG. 4 shows an interrupt processing routine for effecting determination of the exhaust gas recirculation ratio, control of the exhaust gas recirculation flow and generation of an alarm upon occurrence of failure or abnormality in the exhaust gas recirculation flow control. The ECU 47 is so programmed that the interrupt processing routine shown in FIG. 4 can be executed at every predetermined crank angle in the course of execution of the procedure illustrated in FIG. 3.

Now, operation of the engine control system shown in FIG. 1 will be described by reference to FIGS. 3 and 4. At first, description is directed to the main routine shown in the flow chart of FIG. 3. In a first step S1 of the main routine, the ECU 47 fetches a crank angle value from the output signal of the crank angle sensor 45. Subsequently, in a step S2, the ECU 47 makes decision as to whether or not the crank angle value as fetched is 270° CA after the top dead center (i.e., ATDC 270° CA) in the suction stroke. When the decision step S2 results in "NO" (i.e., negative answer), the processing proceeds to a step S4. On the other hand, when the answer of the decision step S2 is affirmative (YES), the processing proceeds to a step S3 where the ECU 47 decides the pressure signal P fetched from the output of the cylinder pressure sensor 32 to be a cylinder pressure value P1 at the crank angle of ATDC 270° CA in the suction stroke, which value is then stored in the memory incorporated in the ECU 47. In the step S4, the ECU 47 makes decision whether the crank angle mentioned above is ATDC 320° CA in the suction stroke. In this conjunction, it is to be noted that the polytropic index assumes a substantially invariable value during the period between ATDC 270° CA and ATDC 320° CA in the suction stroke, which in turn means that change in the cylinder pressure corresponds to or in proportion to the intake air flow. Accordingly, the period between the ATDC 270° CA and the ATDC 320° CA may conveniently be set as a period for measuring the cylinder pressure. When the decision step S4 results in "NO", the step S1 is regained, whereupon the processing mentioned above is repeated. When the answer of the step S4 is affirmative (YES), the processing proceeds to a step S5 where the ECU 47 fetches the pressure signal output from the cylinder pressure sensor 32 at the ATDC 320° CA in the suction stroke as a cylinder pressure value PV2, which is then stored in the memory incorporated in the ECU 47. In a next step S6, the ECU 47 arithmetically determines a pressure difference ΔP between the pressure values P2 and P1 in accordance with ΔP=P2−P1. Further, the ECU 47 fetches the engine rotation speed N (rpm) from the output signal of the crank angle sensor 45 in a step S7 and reads a temperature Ta of fresh air sucked by the engine from the output signal of the intake air temperature sensor 48 in a step S8. Subsequently, in a step S9, the ECU 47 arithmetically determines on the basis of the cylinder pressure difference ΔP and the engine rotation number N (rpm) a first engine charging efficiency Ce in accordance with the following expression (3) which has previously been established experimentally so that a predetermined desired air-fuel ratio can be realized. Namely, $$Ce = CeO \times (a \times \Delta P / \Delta PO + b) \times Ks \qquad (3)$$

where the coefficients a and b are values previously determined experimentally on the basis of the cylinder pressure difference ΔP and the engine rotation speed N (rpm) so that the predetermined air-fuel ratio can be realized. By way of example, the coefficients a and b may assume values of "1.109" and "−0.108", respectively. Further, ΔPO and CeO represent, respectively, table values (reference or index values) of ΔP and Ce set previously as a function of the engine rotation speed (rpm). Furthermore, the coefficient Ks represents a correcting coefficient for correcting the charging efficiency Ce in consideration of the environmental condition and warming-up condition of the engine which can be derived from the temperature Ta of the intake fresh air.

Next, in a step S10, the ECU 47 reads an exhaust gas recirculation correcting quantity ΔCe which is obtained and saved through the interrupt processing routine shown in FIG. 4 and described hereinafter, to thereby correct the charging efficiency Ce in accordance with the following expression:

$$Ce' = Ce - \Delta Ce \qquad (4)$$

In a step S11, the ECU 47 arithmetically determines a fuel injection amount Tp on the basis of the corrected charging efficiency Ce' in accordance with the following expression (5):

$$Tp = Ki \times Ce' \times Kaf \times Ke \qquad (5)$$

where Ki represents a fuel injection conversion coefficient for converting the charging efficiency Ce' to the fuel injection amount of the injector, Kaf represents an air-fuel ratio correcting coefficient, and Ke represents a given correction coefficient such as an air-fuel ratio feedback coefficient for correcting the air-fuel ratio on the basis of the output of the air-fuel ratio sensor 46 or an acceleration correcting coefficient. In a step S12, the ECU 47 determines an ignition timing $\theta_{SA}$ on the basis of the corrected charging efficiency Ce' mentioned above and the engine rotation speed N (rpm) by consulting a relevant map stored in the ROM. In a step S13, the ECU 47 outputs an injector driving signal I1–I4 on the basis of the fuel injection amount Tp obtained from the arithmetic operation performed in the step S11 to thereby drive the associated injector 35. Further, in a step S14, the ECU 47 executes a processing for setting the ignition timing on the basis of the ignition timing $\theta_{SA}$ resulting from the arithmetic operation performed in the step S12. Thus, a spark signal S1–S4 is supplied to the spark plug driver circuit for activating the spark plug 33.

Next, referring to the flow chart of FIG. 4, description will be made of the interrupt processing subroutine executed for the purpose of measuring the exhaust gas recirculation ratio, control of the exhaust gas recirculation flow and generation of an alarm upon occurrence of failure or error in the exhaust gas recirculation control. First, in a step S21, the ECU 47 fetches the output signal of the intake air flow sensor 40 provided upstream of the air intake pipe, i.e., the signal representing the intake air flow Qa, which signal is stored in the memory incorporated in the ECU 47. In this conjunction, it is to be mentioned that the intake air flow signal outputted from the intake air sensor 40 represents the amount only of the fresh air (exclusive of the recirculated exhaust gas). Subsequently, in a step S22, the ECU 47 converts the intake air flow Qa into a second engine charging efficiency Ceafs in accordance with the following expression:

$$Ceafs = Qa / (V/n \times N/30 \times n/2) \qquad (6)$$

where V represents an exhaust gas volume of the engine, N represents the engine rotation speed (rpm) and n represents the number of engine cylinders. In a step S23, the ECU 47 arithmetically determines the exhaust gas recirculation ratio $R_{EGR}$ on the basis of the charging efficiency Ce' determined from the output of the cylinder pressure sensor 32 by taking into account the exhaust gas recirculation and the second engine charging efficiency Ceafs mentioned above in accordance with the following expression:

$$R_{EGR} = 1 - Ceafs / Ce' \qquad (7)$$

Next, in a step S24, the ECU 47 arithmetically determines a correction quantity ΔCe of the charging efficiency Ce' as required by taking into account the exhaust gas recirculation in accordance with the following expression:

$$\Delta Ce = Ce' - Ceafs \qquad (8)$$

The values resulting from the computations mentioned above are stored in the memory of the ECU 47.

In a step S25, the ECU 47 retrieves an exhaust gas recirculation ratio index value from an exhaust gas recirculation map by using as parameters the second engine charging efficiency Ceafs and the engine rotation speed N (rpm) for thereby determining the amount of the exhaust gas to be recirculated in dependence on the engine running condition, which is then followed by comparison of the exhaust gas recirculation ratio $R_{EGR}$ determined in the step S23 with the exhaust gas recirculation index value $I_{EGR}$ determined in the step S25, for thereby controlling correspondingly the operation of the exhaust gas recirculation flow control apparatus 43. More specifically, in a step S26, the ECU 47 compares the quantities $I_{EGR}$ and $R_{EGR}$ with each other. When the comparison shows that $R_{EGR} > I_{EGR}$, the processing now under consideration proceeds to a step S27 where the exhaust gas recirculation flow control apparatus 43 is controlled in the direction to close an exhaust gas recirculation valve (not shown) incorporated therein. On the other hand, when the aforementioned comparison results in that $I_{EGR} > R_{EGR}$, the routine proceeds to a step S28 where the exhaust gas recirculation flow control apparatus 43 is commanded to control the exhaust gas recirculation valve in the valve opening direction to thereby increase the amount of recirculation of the engine exhaust gas. At this juncture, it should be mentioned that in the case of the instant embodiment, the recirculation flow control is performed only once with a quantity preset for the exhaust gas recirculation in every execution of the interrupt processing subroutine. In a step 29, the ECU 47 again compares the second exhaust gas recirculation ratio $R_{EGR}$ with the exhaust gas recirculation index value $I_{EGR}$ in succession to the operation of the exhaust gas recirculation flow control apparatus mentioned above. When the comparison shows that $I_{EGR}=R_{EGR}$, the interrupt processing subroutine comes to an end. Unless $I_{EGR}=R_{EGR}$, indicating that the control of the exhaust gas recirculation ratio is not yet completed, the exhaust gas recirculation flow control apparatus 43 is diagnosed as to occurrence of abnormality. More specifically, in a step S30, the ECU 47 makes decision as to whether or not the operation limit of the exhaust gas recirculation flow control apparatus has been attained or, to say in another way, whether the exhaust gas recirculation valve is fully opened or fully closed. In case the index value is not realized notwithstanding of the maximum operation stroke of the exhaust gas recirculation flow control apparatus, occurrence of abnormality in the latter is decided, whereupon the interrupt subroutine proceeds to a step S31. On the other hand, when it is found in the step S30 that the exhaust gas recirculation flow control apparatus 43 is not at the limit of operation, the current interrupt processing is terminated without making decision as to occurrence of abnormality because there is possibility of the quantity $I_{EGR}$ becoming equal to $R_{EGR}$ in the succeeding execution of the interrupt subroutine. When the occurrence of abnormality is decided, as described above, the ECU 47 generates an alarm of abnormality of the exhaust gas recirculation flow control apparatus 43 by activating an alarm device (not shown) which can emit a sound or light alarm signal.

As will now be understood from the foregoing description, there has been provided according to the present invention an internal combustion engine control system which comprises a pressure sensor for detecting a pressure within an engine cylinder of an internal combustion engine, a crank angle sensor for detecting an engine cylinder identification number and crank angles in synchronism with rotation of the engine, an intake air flow sensor disposed in an air intake pipe of the engine for detecting an intake air flow, an exhaust gas recirculation flow control apparatus for controlling electrically a flow of exhaust gas of the engine which is recirculated to the engine, pressure difference determining means for determining a difference in the pressure within the engine cylinder between predetermined crank angles during a compression stroke of the engine on the basis of output signal of the pressure sensor, charging efficiency determining means for arithmetically determining a first engine charging efficiency on the basis of the outputs of the crank angle sensor and the pressure difference determining means, charging efficiency converting means for converting the intake air flow derived from the output of the intake air flow sensor to a second engine charging efficiency on the basis of the output of the crank angle sensor, and exhaust gas recirculation ratio determining means for arithmetically determining an exhaust gas recirculation ratio on the basis of the first and second engine charging efficiencies. With the engine control system according to the invention, it is now possible to measure the actual exhaust gas recirculation ratio, which has been impossible with the known engine control system equipped with the cylinder pressure sensor.

Further, the exhaust gas recirculation ratio can be controlled more accurately by virtue of the running condition determining means for determining running condition of the engine and the exhaust gas recirculation ratio index value output means for generating an exhaust gas recirculation ratio index value on the basis of the running conditions, for thereby controlling the exhaust gas recirculation flow control means on the basis of the exhaust gas recirculation ratio and the exhaust gas recirculation ratio index value.

Additionally, by providing the means for monitoring the operating state of the exhaust gas recirculation flow control means by comparing the exhaust gas recirculation ratio index value with the exhaust gas recirculation ratio actually determined, for thereby generating an alarm upon detection of abnormality of the exhaust gas recirculation flow control apparatus, discharge of the noxious exhaust gas to the atmosphere can be prevented at an earlier stage.

Many features and advantages of the present invention are apparent from the detailed specification and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation illustrated and described. Accordingly, all suitable modifications and equivalents may be resorted to, falling within the scope of the invention.

We claim:

1. An internal combustion engine control system, comprising:
   pressure sensor means for detecting a pressure within an engine cylinder of an internal combustion engine;
   crank angle sensor means for detecting an engine cylinder identification number and crank angles in synchronism with rotation of said engine;
   intake air flow sensor means disposed in an air intake pipe of said engine for detecting an intake air flow;
   exhaust gas recirculation flow control means for controlling a flow of exhaust gas of said engine which is recirculated to said engine;
   pressure difference determining means for determining difference in the pressure within said engine cylinder between predetermined crank angles during a compression stroke of said engine on the basis of output signal of said pressure sensor means;
   charging efficiency determining means for arithmetically determining a first engine charging efficiency on the basis of the outputs of said crank angle sensor means and said pressure difference determining means;
   charging efficiency converting means for converting the intake air flow derived from the output of said intake air flow sensor means to a second engine charging efficiency on the basis of the output of said crank angle sensor means; and
   exhaust gas recirculation ratio determining means for arithmetically determining an exhaust gas recirculation ratio on the basis of said first and second engine charging efficiencies;

wherein said exhaust gas recirculation flow control means is controlled in accordance with the output of said exhaust gas recirculation ratio determining means.

2. An internal combustion engine control system according to claim 1, further comprising:

running state determining means for determining running condition of said engine; and exhaust gas recirculation ratio index value output means for generating an exhaust gas recirculation ratio index value on the basis of said running state of said engine;

wherein said exhaust gas recirculation flow control means is controlled on the basis of the exhaust gas recirculation ratio obtained from said exhaust gas recirculation ratio determining means and the exhaust gas recirculation ratio index value outputted from said exhaust gas recirculation ratio index value output means.

3. An internal combustion engine control system according to claim 2, further comprising monitor means for monitoring operating state of said exhaust gas recirculation flow control means by comparing the exhaust gas recirculation ratio index value with the exhaust gas recirculation ratio, wherein when occurrence of abnormality in operation of said exhaust gas recirculation flow control means is decided by said monitor means, an alarm is generated.

* * * * *